(12) United States Patent
Chiproot

(10) Patent No.: US 9,528,641 B2
(45) Date of Patent: Dec. 27, 2016

(54) MECHANICAL JOINT RESTRAINT WITH PIPE GRIP RING ASSEMBLY

(75) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 443 days.

(21) Appl. No.: 13/225,497

(22) Filed: Sep. 5, 2011

(65) Prior Publication Data
US 2013/0056980 A1    Mar. 7, 2013

(51) Int. Cl.
F16L 17/00    (2006.01)
F16L 21/00    (2006.01)
F16L 21/08    (2006.01)

(52) U.S. Cl.
CPC ............ F16L 21/002 (2013.01); F16L 21/08 (2013.01)

(58) Field of Classification Search
USPC ............... 285/232, 255, 323, 421, 337, 104, 285/342, 285/231, 113
See application file for complete search history.

(56) References Cited

U.S. PATENT DOCUMENTS

| | | | | |
|---|---|---|---|---|
| 782,482 A * | 2/1905 | Brockett | ................. | 285/231 |
| 2,009,042 A * | 7/1935 | Buchan | ................. | F16L 55/178 285/148.6 |
| 2,009,744 A * | 7/1935 | Pfefferle | ............... | F16L 55/178 138/99 |
| 4,606,565 A * | 8/1986 | Royston | ............... | F16L 21/08 285/337 |
| 5,082,313 A * | 1/1992 | Bryant | .................. | F16L 21/04 285/15 |
| 5,186,503 A * | 2/1993 | von Feilitzen | ........ | F16L 58/187 285/148.17 |
| 6,086,111 A * | 7/2000 | Harper | ................. | F16L 21/08 285/322 |
| 7,004,511 B2 * | 2/2006 | Barron | ................. | F16L 21/08 285/113 |
| 7,571,940 B2 * | 8/2009 | Krausz et al. | ............. | 285/421 |
| 2002/0163195 A1 * | 11/2002 | Vitel | .................. | F16L 21/08 285/379 |
| 2003/0230897 A1 * | 12/2003 | Lundstrom | ........ | F16L 21/007 285/337 |
| 2012/0145270 A1 * | 6/2012 | Krausz | ................ | F16L 21/065 138/97 |

* cited by examiner

Primary Examiner — Aaron Dunwoody
(74) Attorney, Agent, or Firm — Dekel Patent Ltd.; David Klein

(57) ABSTRACT

A mechanical joint restraint including a clamping ring for pressing against a seal of an annular flange, the clamping ring having an annular lip, a pipe grip ring assembly including a yoke with a pair of transverse fastener receiving members, one or more transverse fasteners for fastening the transverse fastener receiving members to one another, and a plurality of grip elements, tightenable against an outer surface of a pipe, wherein the annular inner surfaces of the yoke include adjoining abutment surfaces that form an acute angle, and the grip elements have a wedge shape that is received in and abuts against the adjoining abutment surfaces and one of the abutment surfaces has an extension which is an annular lip that fits over and abuts against the annular lip of the clamping ring.

6 Claims, 2 Drawing Sheets

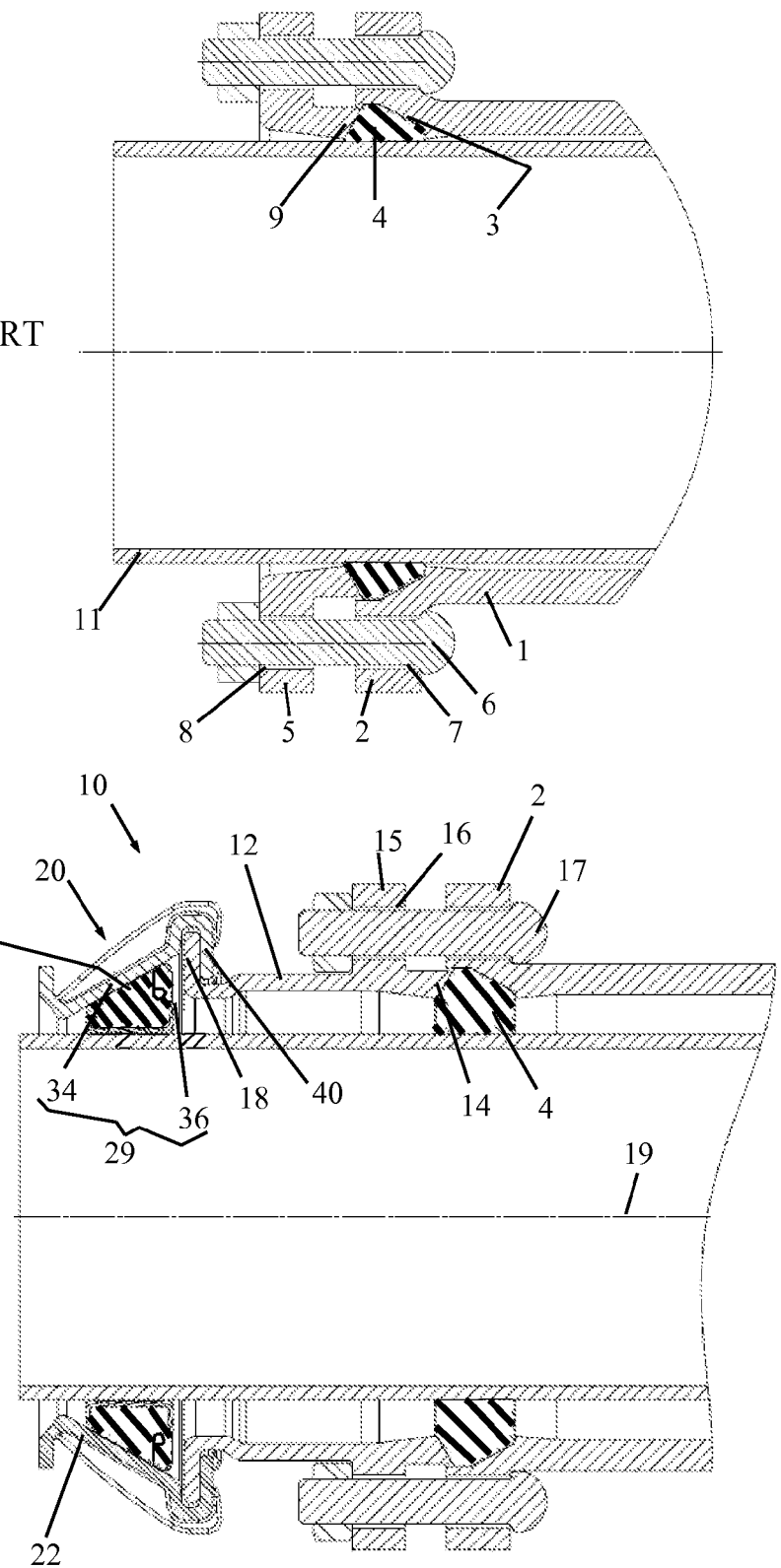

MECHANICAL JOINT RESTRAINT WITH PIPE GRIP RING ASSEMBLY

FIELD OF THE INVENTION

The present invention relates generally to mechanical joint restraints for restraining pipes and pipe connections.

BACKGROUND OF THE INVENTION

Many kinds of couplings for pipes exist in the art. One kind of prior art coupling for pipes is illustrated in FIG. 1. It is noted that throughout the specification and claims, the term "pipe" encompasses any kind of generally cylindrical object, and the terms "clamp" and "coupling" are used interchangeably.

The prior art coupling includes a cylindrical housing 1 with an annular flange 2. The end face of annular flange 2 is formed with an inclined face 3 against which a seal 4 is placed. Seal 4 is made of rubber or other suitable elastomer. A clamping ring 5 is clamped to annular flange 2 with a plurality of axial fasteners 6 circumferentially spaced about the coupling. Fasteners 6 (e.g., bolts and nuts) pass through holes 7 and 8 formed in annular flange 2 and clamping ring 5, respectively. Clamping ring 5 has an inclined axial lip 9 that presses against the seal 4, so that seal 4 is sandwiched between annular flange 2 and clamping ring 5. The tightening force on the inclined surfaces of face 3 and lip 9, provides a wedging radial force on seal 4 so that seal 4 radially tightens against a pipe 11 placed in the coupling. This seals the coupling on the pipe.

There are many kinds of mechanical joint restraints and other accessories in the prior art that incorporate the above type of coupling. These restraints have been used on valves, fittings, hydrants, and other pipe connections where it is necessary to secure together or restrain two members which tend to separate in response to fluid pressure from within. Typical uses for such restraints are sewers and pipe systems for water distribution. One drawback of the prior art restraints is the need to have an inventory or supply that spans a range of pipe diameters.

SUMMARY OF THE INVENTION

The present invention seeks to provide novel mechanical joint restraint with a pipe grip ring assembly, as is described more in detail further below.

There is provided in accordance with an embodiment of the present invention a mechanical joint restraint including a clamping ring that has an inclined face for abutting and pressing against a seal of an annular flange, the clamping ring including an annular clamping flange formed with a hole for a fastener, for fastening the annular clamping flange to the annular flange, and the clamping ring having an annular lip at an end opposite the inclined face, a pipe grip ring assembly including a yoke with a pair of transverse fastener receiving members having mounting holes generally transverse to a longitudinal axis of the clamping ring, one or more transverse fasteners for fastening the transverse fastener receiving members to one another, and a plurality of grip elements, tightenable against an outer surface of a pipe, spaced from one another about the longitudinal axis and disposed along annular inner surfaces of the yoke, wherein the annular inner surfaces of the yoke include adjoining abutment surfaces that form an acute angle, and the grip elements have a wedge shape that is received in and abuts against the adjoining abutment surfaces and one of the abutment surfaces has an extension which is an annular lip that fits over and abuts against the annular lip of the clamping ring.

In accordance with an embodiment of the present invention the grip elements include gripping teeth projecting towards the outer surface of the pipe.

In accordance with an embodiment of the present invention a plurality of individual links are affixed to side portions of the grip elements.

In accordance with an embodiment of the present invention the pipe grip ring assembly includes one or more strengthening ribs spaced about the longitudinal axis.

In accordance with an embodiment of the present invention the yoke includes two members hinged together.

BRIEF DESCRIPTION OF THE DRAWINGS

The present invention will be understood and appreciated more fully from the following detailed description, taken in conjunction with the drawings in which:

FIG. 1 is a simplified sectional illustration of a prior art pipe coupling used with mechanical joint restraints;

FIG. 2 is a simplified sectional illustration of a mechanical joint restraint, constructed and operative in accordance with a non-limiting embodiment of the present invention, including a pipe grip ring assembly.

DETAILED DESCRIPTION OF EXEMPLARY EMBODIMENTS

Figure 3A:
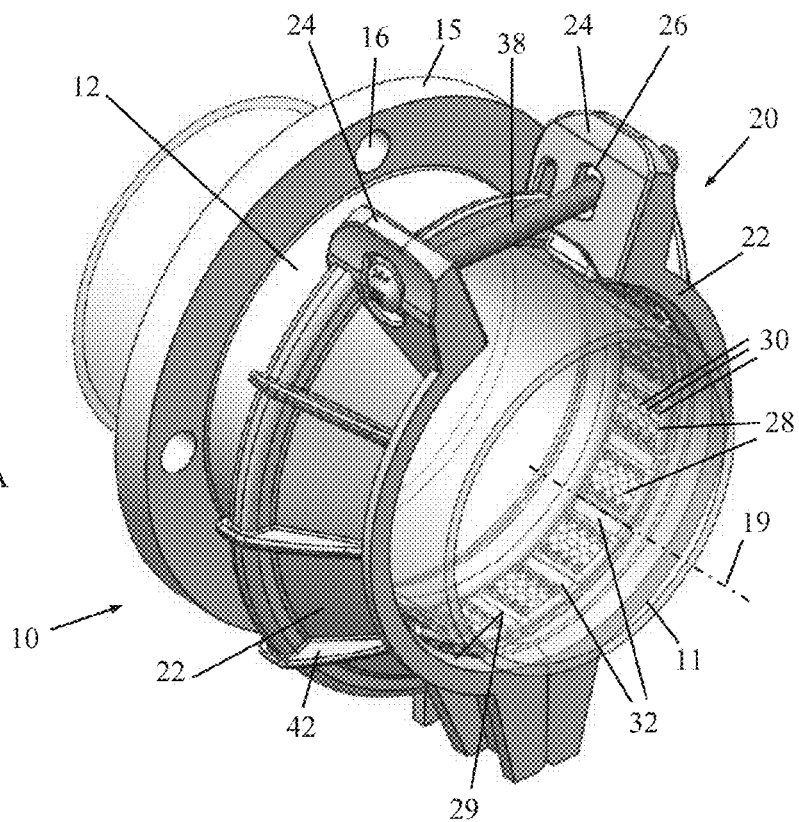
FIGS. 3A and 3B are simplified pictorial illustrations of the mechanical joint restraint and pipe grip ring assembly of FIG. 2.

Reference is now made to FIG. 2, which illustrates a mechanical joint restraint 10, constructed and operative in accordance with a non-limiting embodiment of the present invention.

Mechanical joint restraint 10 may be used in place of the clamping ring 5 of the prior art (FIG. 1) to sealingly press against the seal 4 of the annular flange 2 of the prior art coupling.

Mechanical joint restraint 10 includes a clamping ring 12 that has a face 14 (which may be inclined, but alternatively not inclined) for abutting and pressing against the seal 4 of the annular flange 2. Clamping ring 12 has an annular clamping flange 15 formed with a hole 16 for a fastener 17, for fastening flange 15 to the annular flange 2. Alternatively, clamping ring 12 could have a plurality of annular flanges 15 spaced about a longitudinal axis 19 of ring 12. Clamping ring 12 has an annular lip 18 at an end opposite inclined face 14.

Figure 3B:
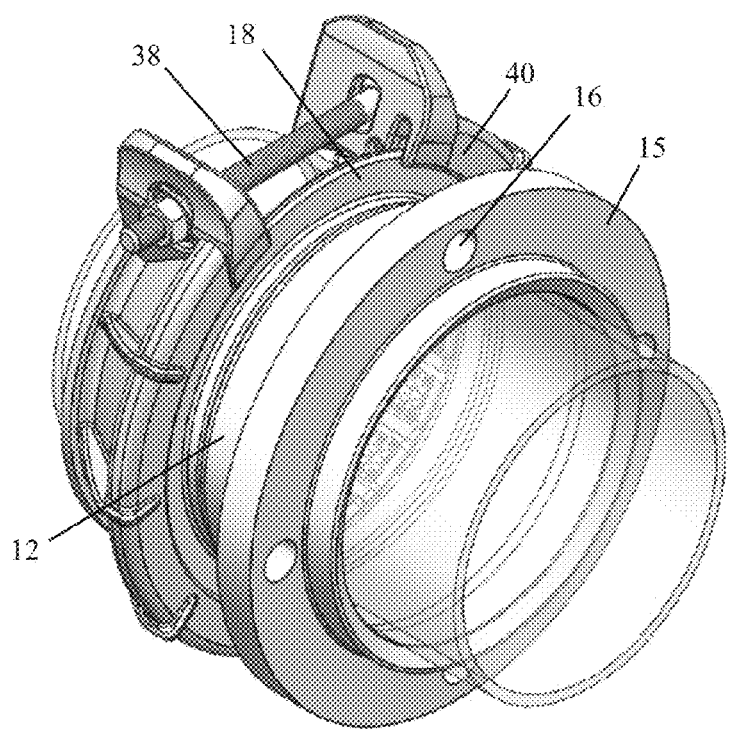

Reference is now additionally made to FIGS. 3A and 3B. Mechanical joint restraint 10 includes a pipe grip ring assembly 20, which includes a yoke 22 with a pair of transverse fastener receiving members 24. In the illustrated embodiment, yoke 22 has two members hinged together, although the yoke could be a one-piece construction, too. Alternatively, yoke 22 may have two (or more) separate members with two (or more) pairs of transverse fastener receiving members 24. In the illustrated embodiment, transverse fastener receiving members 24 are fashioned as lugs with mounting holes 26 generally transverse to the longitudinal axis 19.

A plurality of grip elements 28, tightenable against the outer surface of pipe 11, are spaced from one another about longitudinal axis 19 and disposed along annular inner surfaces 29 of yoke 22. Grip elements 28 may be wedge shaped and may include gripping teeth 30 projecting towards the outer surface of pipe 11. In accordance with an embodiment of the present invention a plurality of individual links 32 (which may be springs or flexible links, for example) are affixed to side portions of adjacent grip elements 28, such as in holes formed in the sides of grip elements 28. Grip elements 28 are tightenable against different diameters and different materials of pipes.

In accordance with an embodiment of the present invention, as seen in FIG. 2, the annular inner surfaces 29 of yoke 22 include adjoining abutment surfaces 34 and 36 that form an acute angle. The grip elements 28 have a wedge shape that is received in and abuts against the adjoining abutment surfaces 34 and 36. The abutment surface 34 has an extension which is an annular lip 40 that fits over and abuts against the annular lip 18 of clamping ring 12.

One or more transverse fasteners 38 fasten the transverse fastener receiving members 24 to one another. Fasteners 38 may include threaded fasteners (e.g., bolts, nuts and washers) as shown in the drawings.

Pipe grip ring assembly 20 may further include one or more strengthening ribs 42 spaced about longitudinal axis 19.

The scope of the present invention includes both combinations and subcombinations of the features described hereinabove as well as modifications and variations thereof which would occur to a person of skill in the art upon reading the foregoing description and which are not in the prior art.

What is claimed is:

1. A mechanical joint restraint comprising:
   a clamping ring that has an inclined face that abuts and presses against a complementary inclined surface of a seal of an annular flange, said clamping ring comprising an annular clamping flange formed with a hole for a fastener, for fastening said annular clamping flange to the annular flange, and said clamping ring having an annular lip at an end opposite said inclined face;
   a pipe grip ring assembly comprising a yoke with a pair of transverse fastener receiving members having mounting holes generally transverse to a longitudinal axis of said clamping ring;
   one or more transverse fasteners for fastening said transverse fastener receiving members to one another; and
   a plurality of grip elements, tightenable against an outer surface of a pipe, spaced from one another about the longitudinal axis and disposed along annular inner surfaces of said yoke;
   wherein said annular inner surfaces of said yoke comprise adjoining abutment surfaces that form an acute angle, and said grip elements have a wedge shape and are received in and abuts against said adjoining abutment surfaces and one of said abutment surfaces has an extension which is an annular lip that fits over and abuts against said annular lip of said clamping ring; and
   said seal of said annular flange has a straight surface perpendicular to said longitudinal axis of said clamping ring and an inclined surface that extends from said straight surface and tapers from said straight surface in a direction away from said longitudinal axis of said clamping ring.

2. The mechanical joint restraint according to claim 1, wherein said grip elements comprise gripping teeth projecting towards the outer surface of the pipe.

3. The mechanical joint restraint according to claim 1, further comprising a plurality of individual links affixed to side portions of said grip elements.

4. The mechanical joint restraint according to claim 1, wherein said pipe grip ring assembly comprises strengthening ribs spaced about the longitudinal axis.

5. The mechanical joint restraint according to claim 1, wherein said yoke comprises two members hinged together.

6. The mechanical joint restraint according to claim 1, wherein said inclined face is inclined towards said longitudinal axis.

* * * * *